United States Patent
Henley et al.

(10) Patent No.: US 8,398,343 B1
(45) Date of Patent: Mar. 19, 2013

(54) RAIL CARGO RESTRAINT SYSTEM

(75) Inventors: Patrick Henley, Rancho Cordova, CA (US); Lori Funk, Folsom, CA (US)

(73) Assignee: Sunrise Mfg., Inc., Rancho Cordova, CA (US)

( * ) Notice: Subject to any disclaimer, the term of this patent is extended or adjusted under 35 U.S.C. 154(b) by 12 days.

(21) Appl. No.: 12/700,591

(22) Filed: Feb. 4, 2010

Related U.S. Application Data (60) Provisional application No. 61/150,224, filed on Feb. 5, 2009.

(51) Int. Cl.
*B60P 7/08* (2006.01)

(52) U.S. Cl. ............. 410/87; 410/32; 410/39; 410/42; 410/118; 410/154; 410/155

(58) Field of Classification Search ............ 410/32, 410/34, 36, 39, 41, 42, 49, 50, 87, 88, 94, 410/117, 118, 121, 129, 140, 154, 155; 206/591, 206/592, 593; 105/355, 374; 248/345.1
See application file for complete search history.

(56) References Cited

U.S. PATENT DOCUMENTS

| | | | |
|---|---|---|---|
| 3,336,069 A * | 8/1967 | Bayer et al. | 410/87 |
| 4,264,251 A | 4/1981 | Blatt | |
| 4,529,345 A | 7/1985 | Van Gompel | |
| 4,572,716 A | 2/1986 | West | |
| 5,154,556 A | 10/1992 | Wappel | |
| 6,431,804 B1 * | 8/2002 | Wetzig, III | 410/94 |

OTHER PUBLICATIONS

The American Association of Railroads (AAR), Pamphlet No. 45, Apr. 1990.
The American Association of Railroads (AAR), Pamphlet No. 4 1965.
The American Association of Railroads (AAR), Pamphlet No. 15.

* cited by examiner

*Primary Examiner* — Stephen Gordon
(74) *Attorney, Agent, or Firm* — Weinroth Tobin, et al.; Andrey A. Millemann; Dennis A. DeBoo

(57) ABSTRACT

The present invention is a cargo restraint system for protecting a barrel-contained cargo in a cargo vehicle space during transportation. In one example, the cargo vehicle may contain two sets of stacked barrels with each set having three vertical levels of barrels. In a first embodiment of the invention, the cargo restraint system includes at least one crush cushion placed at either a front end or a back end of the barrel-contained cargo. The crush cushion provides at least five contact points against each barrel and the contact points are arranged along three levels of crush zones. An end-wall system is placed adjacent to the crush cushion. At least one angle member with a plurality of strap separation slots is coupled to the end-wall system. Each strap is threaded through the strap separation slots and is anchored to the cargo vehicle to securely hold the barrel-contained cargo to the crush cushion and the end wall system.

5 Claims, 11 Drawing Sheets

RAIL CARGO RESTRAINT SYSTEM

CROSS-REFERENCE TO RELATED APPLICATIONS

This application claims the benefit of U.S. provisional patent application Ser. No. 61/150,224, filed on Feb. 5, 2009.

TECHNICAL FIELD

This invention relates to the field of cargo restraint systems and, more specifically, to a cargo vehicle restraint system for securing and restraining cargo to enhance its survivability during transportation.

DISCUSSION OF RELATED ART

Containers, boxes, drums or the like are frequently used for the shipment of many types of cargo in vehicles like railroad boxcars, ship containers or truck trailers. Shippers often desire to have cargo securement devices to accomplish the restraint of the cargo within the cargo container of the vehicle, so that the cargo and the cargo container are operated functionally as one unit during transport. Unless a cargo load is adequately secured within its vehicular carrier, the motion of the vehicle caused by braking forces, bumps and swaying from uneven roads, rail vibration, dips in the track, etc. will cause movement or shift of the cargo with consequent damage to the cargo and the carrier.

Various means have been devised for restraining cargo enclosed within drums, boxes or other containers. Primarily, cargoes were stabilized by methods of bracing, tiedowns like cables, straps, anchors or bolts.

One prior art device taught in U.S. Pat. No. 4,264,251, issued to Blatt on Apr. 28, 1981, discloses a load-retaining barrier construction including a flexible panel assembly and sealing strips that are adhered to opposing sidewalls of a container. In addition to this requirement, a separate adhesive system is needed to be applied in the strips for the joining of panels. Even though the strips come together at the juncture, there is a chance for slippage of the joined panels.

U.S. Pat. No. 4,529,345, issued to Van Gompel on Jul. 16, 1985, discloses a device for securely restraining open head shipping drums during vehicular transport. The device includes a platform member adjoined with an upright member, an upper load-bearing surface for receiving a cargo load and a strap retaining means. However, such a device is adapted to hold only four shipping drums.

U.S. Pat. No. 4,572,716, issued to West on Feb. 25, 1986, discloses a paperboard shipping assembly provided for maintaining the relative position of cylindrical drums or barrels that contain cargo during shipment. The shipping assembly includes a cushioning means that is sandwiched by shipping chocks. Such an arrangement requires an additional chock between the drums for holding the drums in place. This limits the number of cargo containers that can be transported.

U.S. Pat. No. 5,154,556, issued to Wappel on Oct. 13, 1992, provides a device for retaining cylindrical containers in an upright condition for transport. The retention device includes vertical retention posts and engage-able straps with a buckle arrangement, for retaining the containers firmly against the retention posts and against each other. However, this retention device is adaptable only for a single level of construction of the cylindrical containers. Such a device includes straps that are complicated in construction, which provides a tension to the cylindrical containers and allows the straps to release from the buckle, thereby allowing the cargo to shift.

The American Association of Railroads (AAR) provides a series of "Closed Car Loading Methods Manuals and Pamphlets" which describe a number of recommended methods for loading and restraining barrel cargo. For example, the AAR's 1990 Pamphlet No. 45 describes stationary end wall systems which use straps attached to lading anchors located in the side of the boxcar walls to restrain general cargo. This system provides no cushioning, however. Pamphlet No. 4 (1965 revised) describes the further application of stationary end walls and straps to secure barrel cargo. In the representations shown, the barrel cargo is stacked to a level of two-high, which appears to be the maximum amount that can be accommodated by the AAR methods.

Additionally, especially with regard to rail boxcar containers, the usage of heavy steel end walls to restrain cargo has been employed. These end walls are movable on tracks within the boxcar container and may be up to six inches in thickness. The use of such heavy steel end walls has resulted in numerous worker accidents, from falling and crushing, and as such, they present a significant safety hazard. These steel end walls also do not provide any cushioning capacity.

Therefore, there is a need for a cargo restraint system that would be inexpensive, safe to use, easy to install and designed for expeditious adjustment to stack cargo at various levels, and with regard to barrel cargo to stack up to three levels. Further, one embodiment of such a device would include crush cushions that provide numerous contact points for supporting the barrel-contained cargo, thereby avoiding the shifting of the cargo. The present invention accomplishes these objectives.

SUMMARY OF THE INVENTION

The present invention is a cargo restraint system for protecting cargo in a cargo vehicle container. The cargo vehicle container can be an enclosed cargo vehicle container such as a railroad boxcar, a truck trailer or a shipping container. Such containers typically have a rectangular cargo space with two closed ends and two sides. As further revealed herein, a railroad boxcar with a barrel contained cargo is used as an application of the invention, but the invention can be employed with any cargo container, such as boxes or cans.

In an application herein to railroad boxcars with a barrel-contained cargo, the invention is intended to replace and provide a safer alternative for current steel end wall systems. In a preferred embodiment, the cargo restraint system is comprised of at least one crush cushion placed at both the front end and back end of a barrel-contained cargo load. In the exemplary barrel-contained cargo described herein, the crush cushion has a recess that is shaped to formably fit against the barrel-contained cargo, but in other embodiments, the crush cushion recess could be shaped to fit any cargo container shape, including boxes and cans. An end-wall system is placed adjacent to the crush cushion. At least one angle member having a plurality of strap separation slots is coupled to the corners of the end-wall system, whereby each strap of a plurality of straps passes through at least one strap separation slot. The plurality of strap separation slots are separated by a distance sufficient to keep the straps positioned properly as the cargo shifts within the cargo vehicle container and also to avoid tangling of the plurality of straps. Each strap is passed through the strap separation slots for holding the barrel-contained cargo to the crush cushion and the end wall system. Tightening the straps brings the end-wall system into flush and tight contact with the crush cushions, thereby protecting the barrel-contained cargo during hard stops and impact forces that are greater than the stopping forces of the vehicle containing the cargo.

In a second and third embodiment of the invention, the invention is comprised of an end wall without an adjacent crush cushion. However, these embodiment retain the light weight of the preferred embodiment, when compared with the steel end wall systems of the prior art.

DETAILED DESCRIPTION OF THE PREFERRED EMBODIMENT

Figure 1:
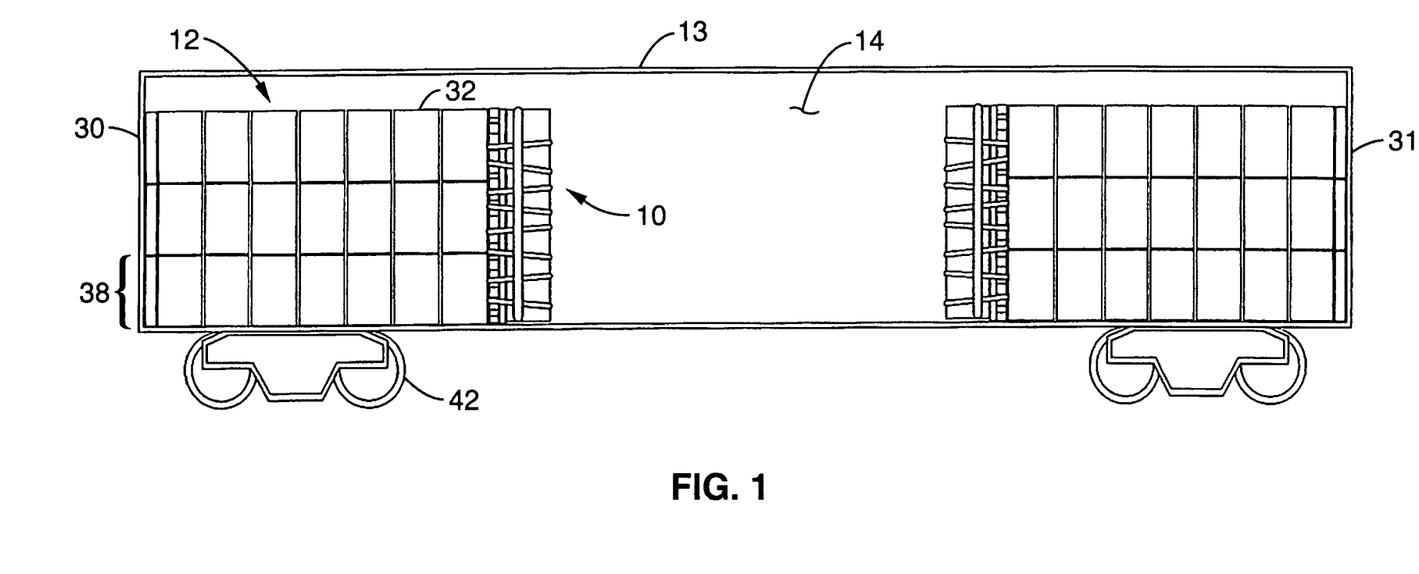
FIG. 1 is a side view of the cargo restraint system of the present invention, shown in position for protecting a barrel-contained cargo in a cargo vehicle cargo space.

Referring now specifically to the drawings, FIG. 1 shows a first preferred embodiment of the cargo restraint system 10 for protecting a barrel-contained cargo 12 in a cargo vehicle 13, such as a railroad boxcar. As shown, two separate stacks of barrels 32 are evenly spaced within the cargo space 14. A cargo space 14 may contain three vertical levels 38 of barrels 32.

Figure 2:
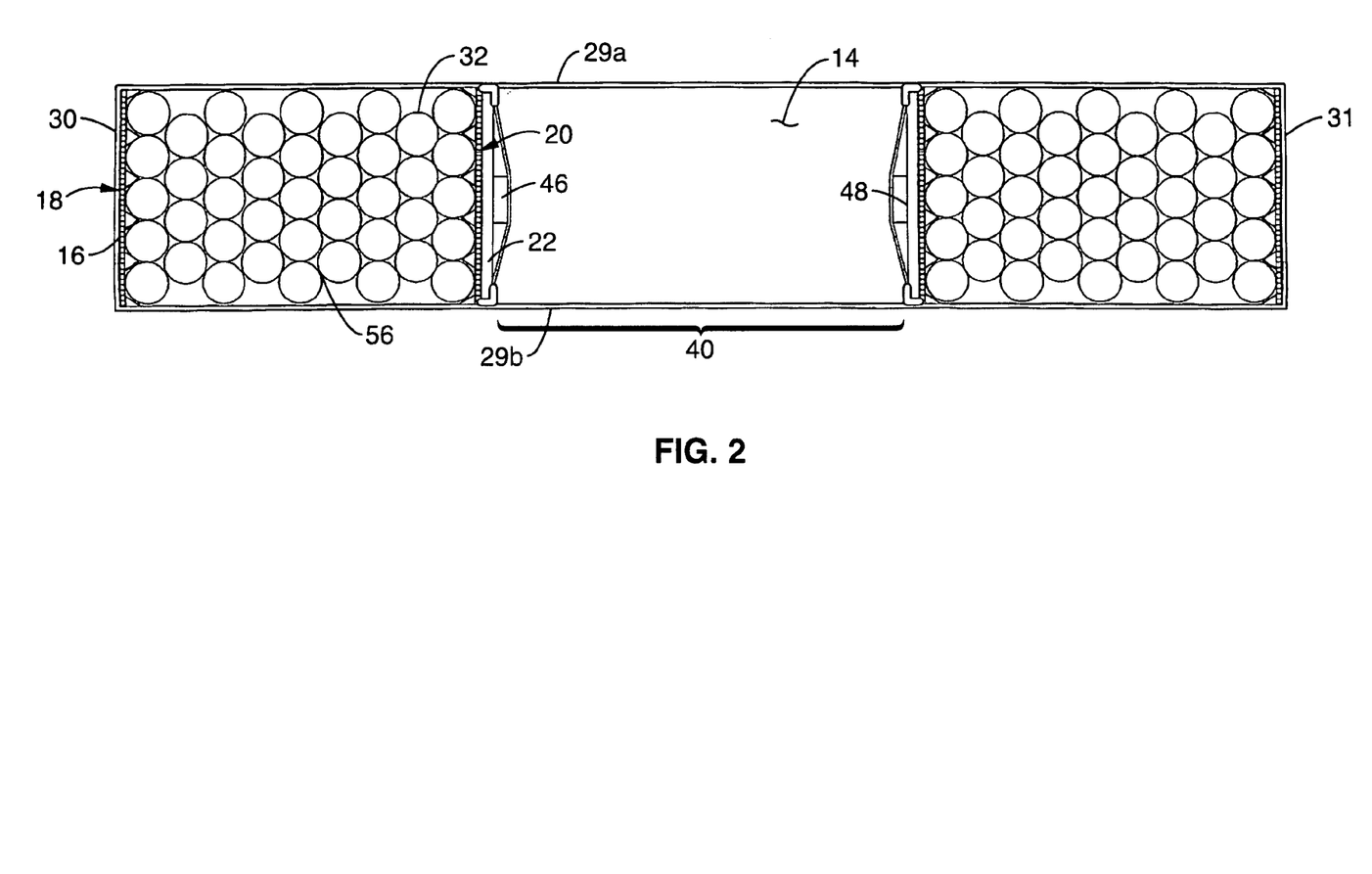
FIG. 2 is a top plan view of the cargo restraint system of FIG. 1.

As shown in FIG. 2, in the preferred embodiment, at least one crush cushion 16 is placed against at least one terminus wall 30 of the cargo vehicle 13. Terminus wall 30 is joined to two parallel walls 29A and 29B, which extend forward to join a second terminus wall 31, the terminus walls and parallel walls defining the boundaries of cargo space 14. The crush cushion 16 has a horizontal length of a width sufficient for spanning across the width of the cargo space 14 and when used for barrel cargo is preferably as tall as one barrel 32. The cargo space 14 may contain at least two sets of stacked barrels 32 placed at each end of the cargo space 14 with a gap 40 separating the two sets of stacked barrels 32. The gap 40 may be 20 feet, but depending on the load requirements the gap can be any size. The cargo restraint system 10 is comprised of at least one crush cushion 16 placed at either a front end 18 or a back end 20 of the barrel-contained cargo 12. At least one rigid vertical member 46, such as a wooden 3×6 is placed at a center 48 of an end-wall system 22. Alternately, rigid vertical member 46 could be triangulate in shape (not shown), with the flat side of the triangle base resting against side 21 of end wall 22. Each barrel 32 has at least two points of contact 56 against the adjacent barrels 32, which spreads out force better than a point-to-point contact arrangement of the barrels 32.

Figure 3:
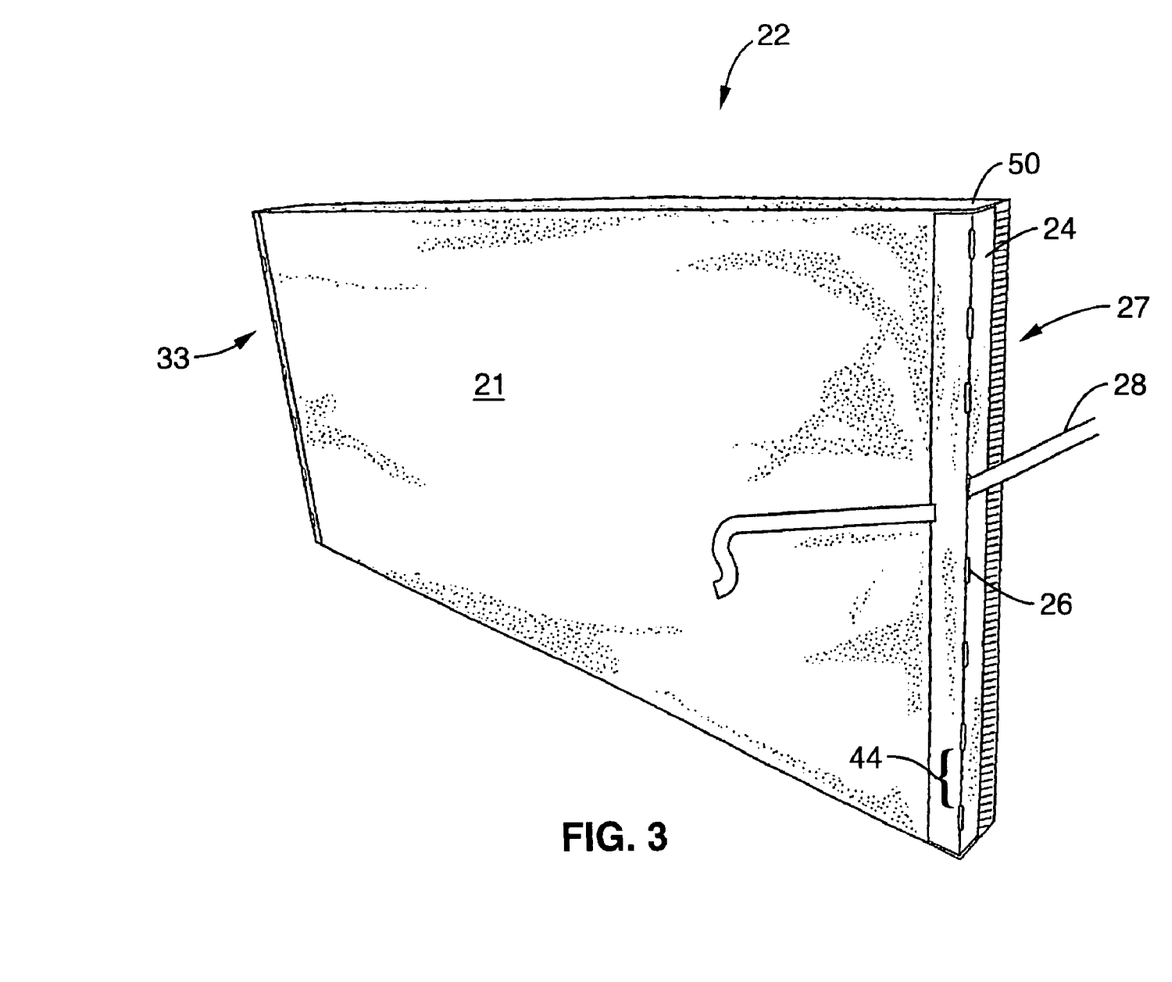
FIG. 3 is a perspective view of an end-wall system of the present invention, shown with an angle member having a plurality of strap separation slots and a strap passing through one such strap separation slot.

The end-wall system 22 of the preferred embodiment is illustrated in FIG. 3 and further includes at least one angle member 24 coupled to at least one corner 50 thereof. End wall 22 has a horizontal length of a width sufficient for spanning across the width of the cargo space 14. When placed in position across the width of the cargo space 14, the terminus 27 and 33 of end wall 22 would be adjacent sides 29A and 29B of cargo vehicle 13. Each angle member 24 is preferably metallic angle iron or the like and forms a reinforcing "cap" over corners 50, wherein corners 50 are adjacent the non-cargo-facing side 21 of end wall 22. The angle member 24 has at least one strap separation slot 26 for receiving a strap 28 in order to restrain end wall 22. In the drawings, multiple straps 28 are shown restraining the end wall 22 and the barrel cargo 12, hence a matching plurality of strap separation slots 26 are shown through which each strap 28 passes. The plurality of strap separation slots 26 are separated by a distance 44 sufficient to avoid tangling of the plurality of straps 28. Additionally, the strap separation slots 26 prevent the straps 28 from falling, should a shift in the cargo 12 cause the release of tension against the straps. Even if straps 28 loosen due to a shift in the cargo 12, the strap separation slots 26 maintain the straps in a preferred static position, so that when the cargo 12 repositions itself due to further movement, the straps will retighten to maintain the cargo 12 in its is proper restrained position within the cargo space 14. The plurality of straps 28 may be made of high-strength poly-woven material known in the cargo strapping arts.

Figure 4:
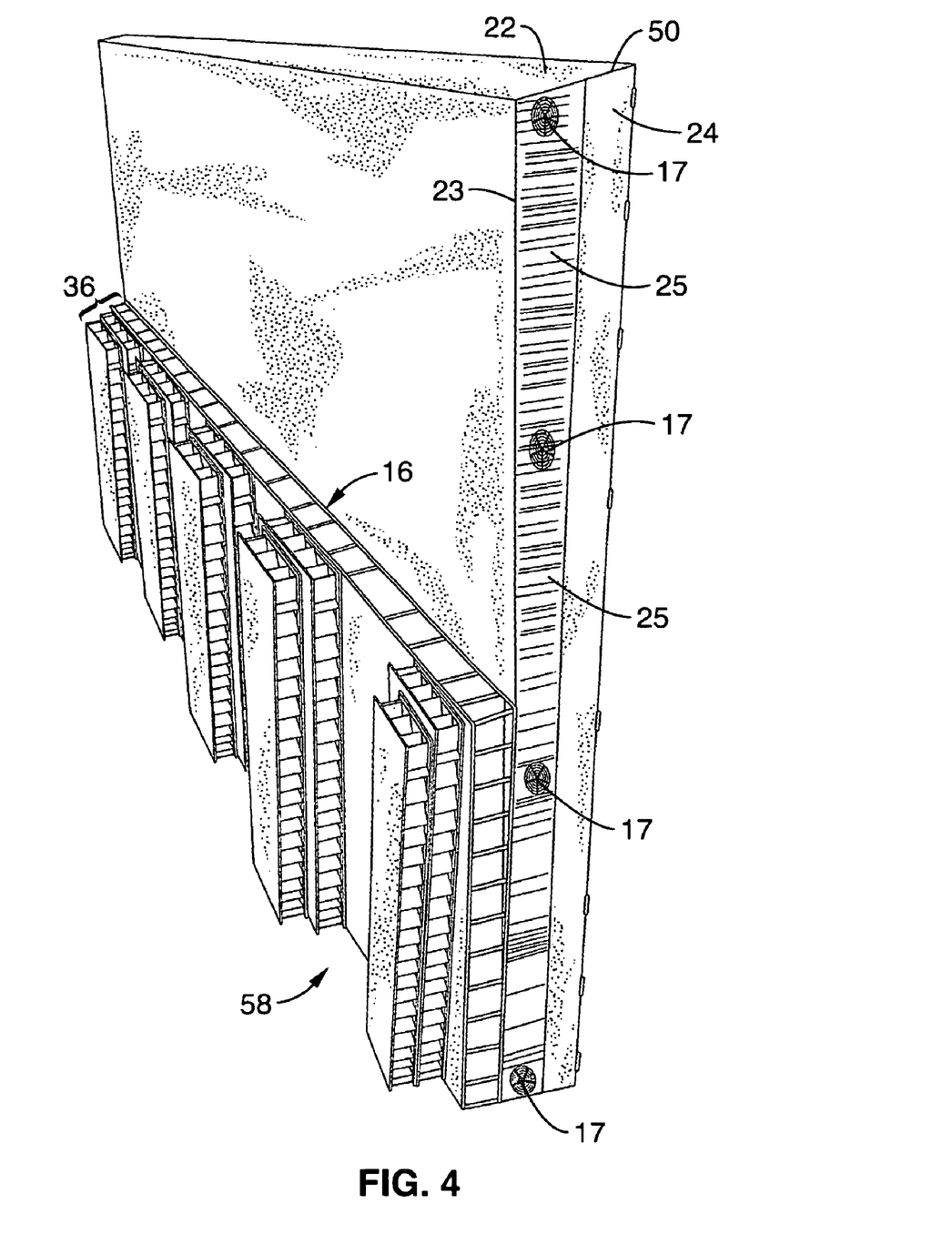
FIG. 4 is a perspective view of a crush cushion of the invention shown adjacent to an end-wall system.

Referring to FIG. 4, the end-wall system 22 has a plurality of wooden cross-members 17, each placed at a top, bottom and center of the end-wall system 22. A further crush area 25 fills the space between the cross members 17 and spans horizontally across the end-wall system 22. The crush area adds further cushioning backup to the crush cushion in the case of extra hard collision or braking events. Crush area 25 can be comprised of corrugated cardboard filler, for example. A cardboard skin 23 surrounds the cross members 17 and cardboard filler of the crush area, to give enclosure and structure to the final assembly of the end-wall system 22. The angle member 24 is coupled to the corner 50 of the end-wall system 22 by anchoring to cross members 17.

Figure 5:
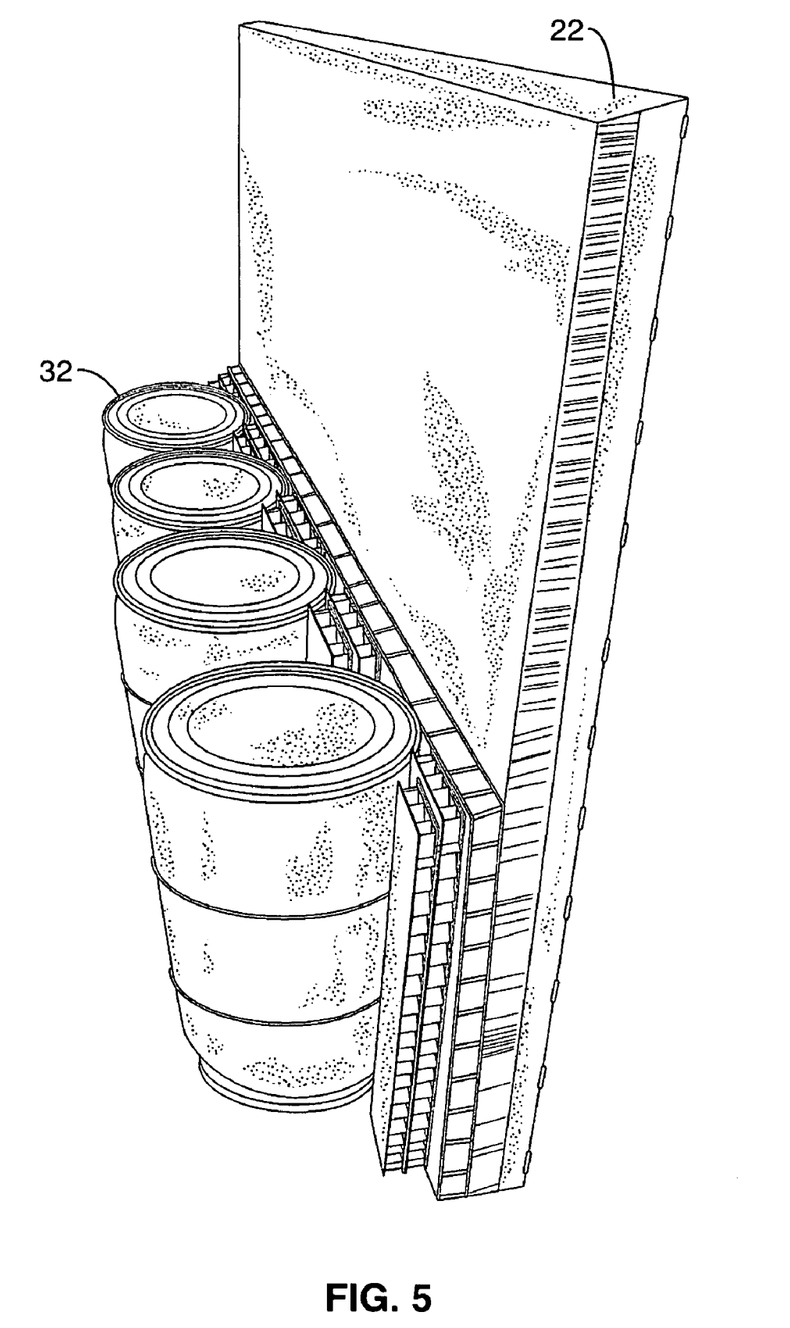
FIG. 5 is a perspective view of a cargo restraint system, illustrating barrels placed against an end-wall system and a crush cushion.

FIGS. 4 and 5 shows the crush cushion 16 placed against the end-wall system 22. The crush cushion 16 has three levels of crush zones 36. Each barrel 32 is placed in a recess 58 formed between the crush zones 36. With other types of cargo containers such as boxes or cans, the recess 58 can be re-formed as appropriate to accommodate these other types of containers. The plurality of crush cushions 16 is preferably located at both the ends (18 and 20) of a plurality of stacked barrels 32. Each strap 28 of the plurality of straps 28 passes through the strap separation slots 26 for holding the barrel-contained cargo 12 to the crush cushion 16 and the end-wall system 22. In the case of a boxcar vehicle container, the inventive system can stack three crush cushions high and therefore, three barrels high.

Figure 6:
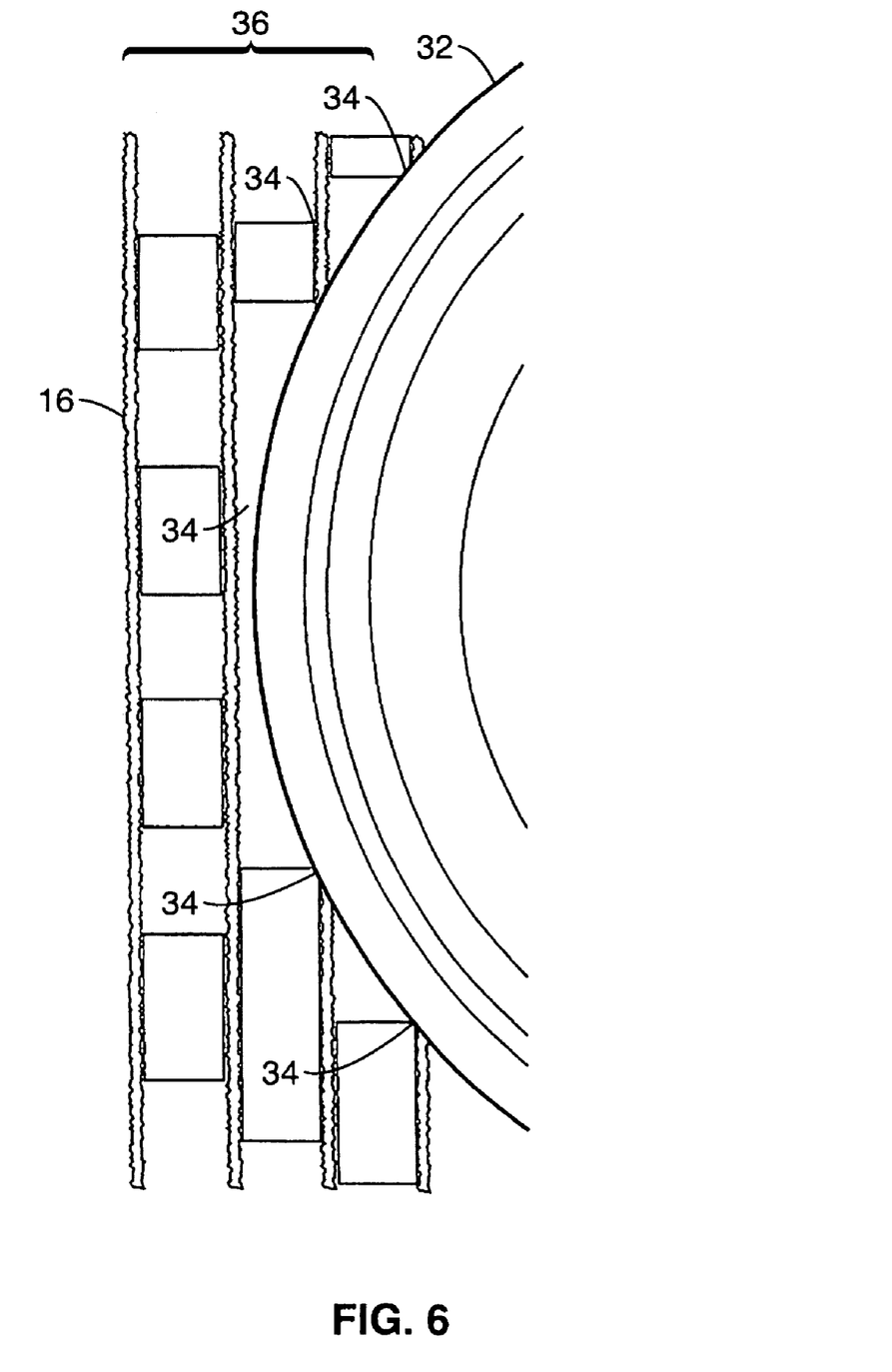
FIG. 6 is an enlarged top plan view of a crush cushion of the invention, illustrating points of contact between a barrel and a crush cushion.

FIG. 6 illustrates an enlarged top plan view of the barrel 32 placed in the recess 58 formed between the crush zones 36. The crush cushion 16 provides at least five contact points 34 against each barrel 32. The contact points 34 are arranged along the three levels of crush zones 36. Pressure from the plurality of barrels 32 is spread through the crush cushion 16 during hard stops or minor impacts. The crush cushion 16 lies between the barrel-contained cargo 12 and the end-wall system 22. The crush cushion 16 may also lie between the cargo 12 and end walls 30, 31 of the cargo vehicle 13.

Figure 7:
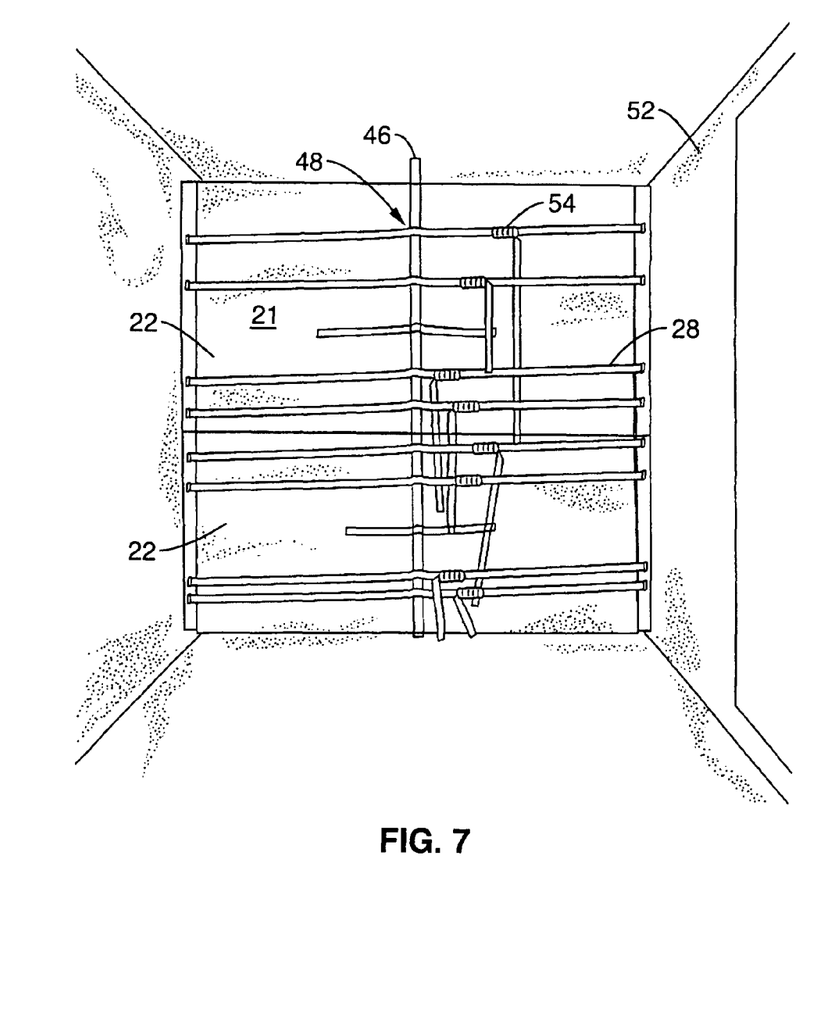
FIG. 7 is a perspective view of a cargo restraint system, illustrating a plurality of the straps threaded through the strap separation slots of the corner angles and tightened to hold a barrel cargo in place within a vehicle container.

As shown in FIG. 7, vertical member 46 is located against non-cargo-facing side 21 of the end-wall system 22. Vertical member 46 is positioned equidistant in the center 48 of side 21 and provides a structural element to tighten straps 28 against. The structural rigidity provided by vertical member 46 and the counter-acting force provided by straps 28 prevents end wall 22 from bowing under the force of shifting cargo, when the cargo vehicle 13 experiences a sudden stop or collision. A barrel-contained cargo 12 in the cargo vehicle 13 is restrained for enhancing its survivability by placing at least one crush cushion 16 at the front end 18 or the back end 20 of the barrel-contained cargo 12. The stack of barrels 32 is placed against the crush cushions 16 in such a way that each barrel 32 has at least two points of contact 56 against the adjacent barrels 32. At least one crush cushion 16 is placed at the ends 18, 20 of each stack of barrels 32. The plurality of straps 28 is threaded through a lading anchor (not shown) of a longer interior sidewall 52 of the cargo vehicle 13. Each strap 28 is threaded back through a buckle 54 after applying a tightening device (not shown) to gather up slack therein. Tightening the plurality of straps 28 brings the end-wall system 22 into flush and snug contact with the crush cushions 16.

Figure 8:
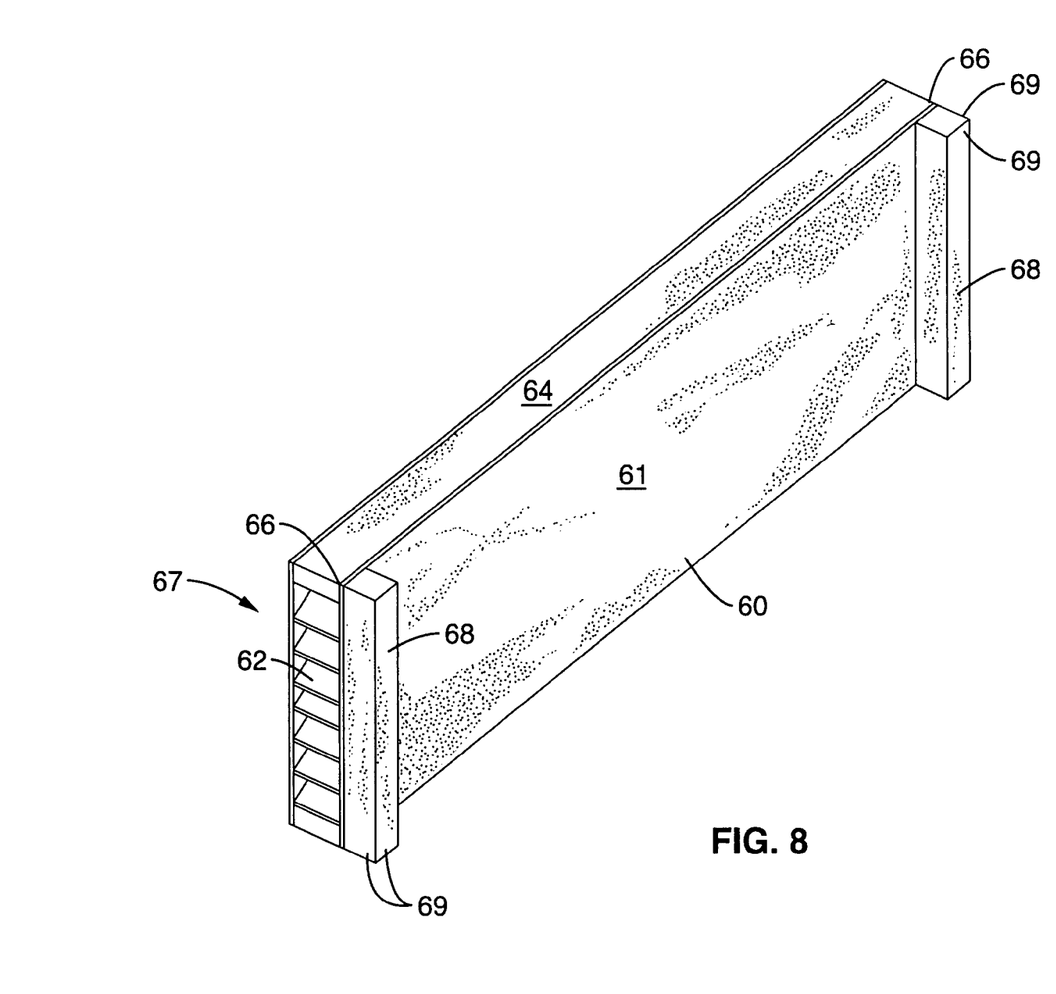
FIG. 8 is a perspective view of a second embodiment of an end wall system of the present invention.
Figure 9:
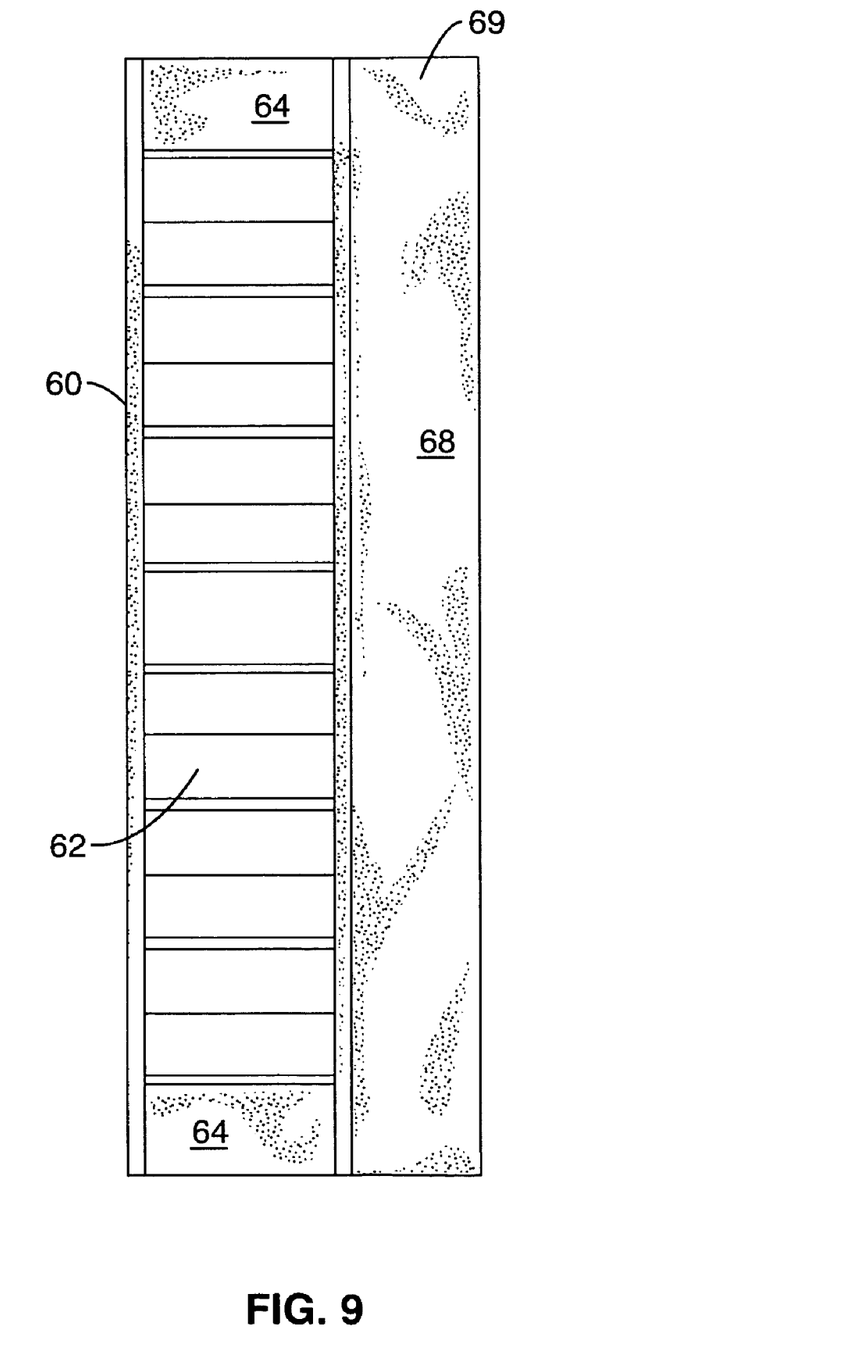
FIG. 9 is side view of the second embodiment of the end wall system shown in FIG. 8.
Figure 10:
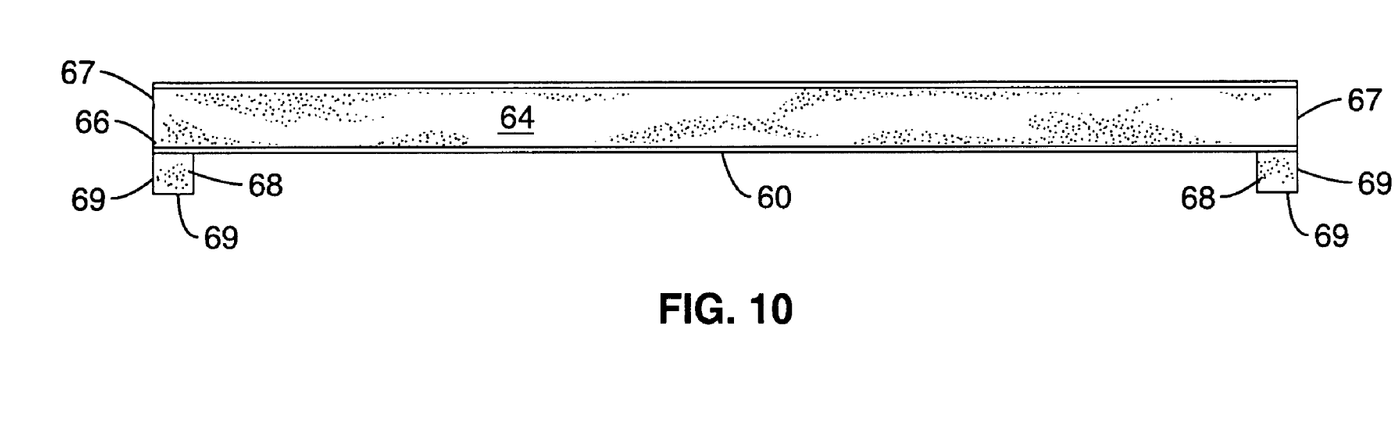
FIG. 10 is a plan view of the second embodiment of the end wall system shown in FIG. 9.

In a second embodiment of the invention, as shown in FIGS. 8, 9 the system employs an end wall 60 having no crush cushion adjacently applied. The end wall itself retains crush area 62 constructed from reinforced cardboard in its center as previously described herein. As shown in FIG. 9, a side view of the end wall shows the reinforced cardboard crush area 62. At the top and bottom of the crush area are cross members 64 which provide structure and rigidity to end wall 60. Further, referring to FIG. 10, the corners 66 of the end wall are reinforced with rigid end members 68 which couple to non-cargo-facing side 61 of end wall 60. Reinforcing end members 68 can be wooden 4×4's for example. Straps (not shown) are tightened across and along the sides 69 of end members 68 and end members distribute the force applied by straps along sides 69 to prevent any crushing at the corners 66 of end walls 60 from occurring.

Figure 11:
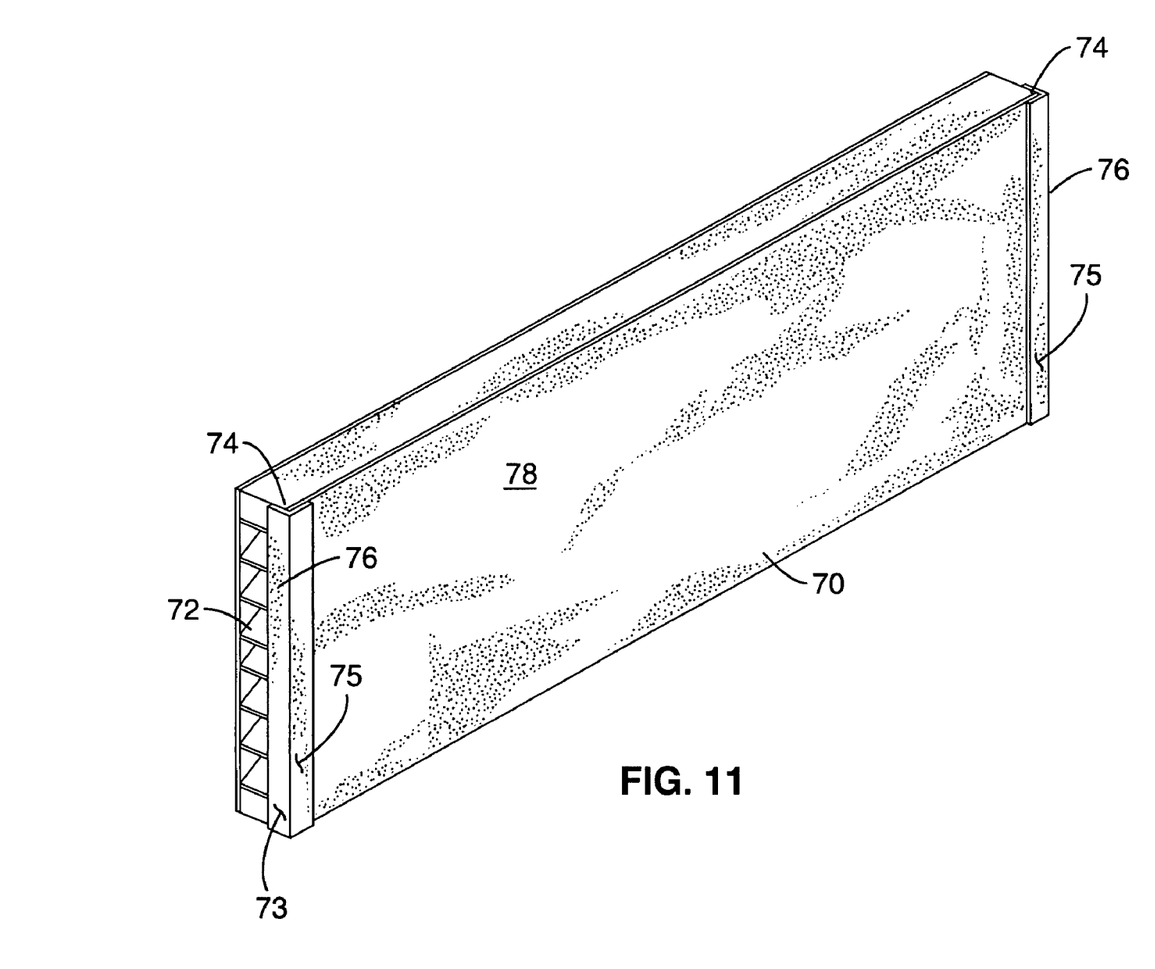
FIG. 11 is a perspective view of a third embodiment of an end wall system of the present invention.

A third embodiment of the invention is shown if FIG. 11. This embodiment employs an end wall 70 having crush area 72, as described previously. Reinforcement at the corners 74 of end wall 70 is achieved in this embodiment through placement of metallic angle members 76 adjacent non-cargo-facing side 78 of end wall 70. Angle members 76 wrap around corners 74 thus providing sides 73, 75 of angle members 76 to distribute the force of straps (not shown) when this embodiment of end wall is in place. Unlike the preferred embodiment, this embodiment contains no separation slots 26.

The foregoing written description describes a cargo restraint system for enhancing the survivability of a barrel-contained cargo in a cargo vehicle during transportation. This invention could further be applied to many types of cargo by modifying the shape of the recesses of the crush cushions to form fit to other types of cargo. Also, if the crush cushions are not used as with other embodiments described herein, the cargo that can be carried would not be defined by its shape.

Finally, although the description above contains many specificities, these should not be construed as limiting the scope of the invention, but as merely providing illustrations of some of the presently preferred embodiments of this invention. This invention may be altered and rearranged in numerous ways by one skilled in the art without departing from the coverage of any patent claims which are supported by this specification.

The invention claimed is:

1. A cargo restraint system for protecting cargo in a cargo vehicle having a cargo space, said cargo space having a closed end and two parallel walls extending from said closed end, said system comprising:
    an end wall of a spanning length for spanning between said parallel walls of said cargo vehicle cargo space, said end wall terminating at a first terminus and a second terminus, each said terminus having first and second corners adjacent a non-cargo-facing side of said end wall;
    said end wall further comprising a crushable center for absorbing force;
    a crush cushion adjacent a first cargo-facing side of said end wall, said crush cushion having a spanning length for spanning between said parallel walls of said cargo vehicle cargo space, said crush cushion having a cargo-bearing face recessed to formably receive the body of at least one cargo item; and
    first and second vertical angle members attached to said first and second corners; and
    at least one slot imparted into said angle members along a vertical length of said angle members.

2. The cargo restraint system as recited in claim 1, further comprising a vertical rigid member positioned against said non-cargo-facing end wall side and in a center of said end wall parallel to said first terminus and said second terminus.

3. The cargo restraint system as recited in claim 2, further comprising at least one cargo strap spanning across said non-cargo-facing end wall side and over said vertical rigid member, said strap further threading into said at least one slot of said angle members, said strap tightening said system against a cargo load and said strap anchoring to an anchor point.

4. The cargo restraint system as recited in claim 2, wherein said vertical rigid member has a vertical length and is triangulate-shaped along its vertical length.

5. The cargo restraint system as recited in claim 1, further comprising an additional crush cushion positioned between said closed end of said cargo space and said cargo.

\* \* \* \* \*